United States Patent [19]

Kamihara

[11] Patent Number: 5,193,340
[45] Date of Patent: Mar. 16, 1993

[54] EXHAUST GAS PURIFYING SYSTEM FOR INTERNAL COMBUSTION ENGINE

[75] Inventor: Tetsuya Kamihara, Yokosuka, Japan

[73] Assignee: Nissan Motor Co., Ltd., Yokohama, Japan

[21] Appl. No.: 690,783

[22] Filed: Apr. 25, 1991

[30] Foreign Application Priority Data

May 10, 1990 [JP] Japan .................. 2-120661

[51] Int. Cl.$^5$ .............................................. F01N 3/02
[52] U.S. Cl. ...................................................... 60/286
[58] Field of Search ........................................... 60/286

[56] References Cited

U.S. PATENT DOCUMENTS

| | | | |
|---|---|---|---|
| 4,566,271 | 1/1986 | French | 60/286 |
| 4,756,155 | 7/1988 | Shinzawa | 60/285 |
| 4,887,426 | 12/1989 | Goerlich | 60/274 |
| 5,044,158 | 9/1991 | Goerlich | 60/286 |

FOREIGN PATENT DOCUMENTS

| | | |
|---|---|---|
| 3817980 | 11/1989 | Fed. Rep. of Germany . |
| 122721 | 7/1984 | Japan .................. 60/286 |
| 2114913 | 9/1983 | United Kingdom . |

Primary Examiner—Douglas Hart
Attorney, Agent, or Firm—Foley & Lardner

[57] ABSTRACT

An exhaust gas purifying system including a trap filter for trapping particulates and the like which are discharged from a diesel engine. The trap filter in disposed in an exhaust passageway and carries an oxidation catalyst. A fuel injector valve is provided to inject fuel into the exhaust passageway upstream of the trap filter, so that the trap filter is supplied with fuel. The fuel is burned in the trap filter under the action of the oxidation catalyst thereby burning the particulates and the like so as to achieve a regeneration operation for the trap filter. The amount of fuel from the fuel injector valve is controlled to increase as an intake air amount increases and to decrease as an exhaust gas temperature increases.

15 Claims, 5 Drawing Sheets

EXHAUST GAS PURIFYING SYSTEM FOR INTERNAL COMBUSTION ENGINE

BACKGROUND OF THE INVENTION

1. Field of the Invention

This invention relates to improvements in an exhaust gas purifying system including a trap filter for trapping particulates discharged from an internal combustion engine, and more particularly an exhaust gas purifying system in which a regeneration operation of the trap filter is effectively performed without causing thermal damage to the trap filter.

2. Description of the Prior Art

Most diesel engines are equipped with a trap filter for trapping particulates and the like which are discharged from an engine for the purpose of preventing them from being emitted to the ambient air. When the back pressure of the engine increases due to the accumulation of the particulates trapped by the trap filter, the particulates are periodically burned to regenerate the trap filter, thereby preventing the back pressure from affecting engine performance.

For the purpose of burning the particulates, unburned fuel containing burnable gases, such as hydrocarbon and/or carbon monoxide, is supplied to the upstream side of the trap filter and burned together with the particulates. During the burning, the trap filter may be thermally damaged, and therefore the supply amount of fuel must be carefully controlled in order to avoid such damage.

In view of the above, it has been proposed to perform the regeneration of the trap filter by controlling the fuel supply amount to the trap filter in accordance with an exhaust gas temperature, upon judging a regeneration required time or timing a of the trap filter in accordance with accumulated values of engine speed. Such an arrangement is disclosed, for example, in Japanese Patent Provisional Publication No. 59-122721. With this arrangement, in an exhaust gas high temperature condition, the trapped particulates are naturally burned or securely burned with a small amount of fuel supplied to the trap filter. In an exhaust gas low temperature condition, the fuel supply amount is increased to effectively burn the trapped particulates.

However, the following difficulties have been encountered in the above discussed conventional arrangement. That is to say, the fuel supply amount required for the regeneration of the trap filter changes not only in accordance with the exhaust gas temperature but also in accordance with an intake air amount during a regeneration operation of the trap filter regeneration. More specifically, when engine speed decreases to reduce an exhaust gas amount during the trap filter regeneration operation, a fuel concentration in exhaust gas becomes excessively high thereby providing the possibility of the filter being thermally damaged or partially burned. When the exhaust gas amount is large in the low exhaust gas temperature condition in which the fuel supply amount is small, the trapped particulates cannot be effectively burned.

Thus, with the conventional arrangement, an appropriate regeneration operation cannot be achieved from the view points of trap filter regeneration efficiency and durability of the trap filter, in the situation where the fuel supply amount is controlled merely in accordance with the exhaust gas temperature at the start of the regeneration operation.

SUMMARY OF THE INVENTION

It is an object of the present invention to provide an improved exhaust gas purifying system for an internal combustion engine, which can overcome the difficulties encountered in the conventional exhaust gas purifying system.

Another object of the present invention is to provide an improved exhaust gas purifying system, in which the regeneration operation of a trap filter is effectively carried out without degrading the durability of the trap filter.

A further object of the present invention is to provide an improved exhaust gas purifying system, in which the amount of fuel to be supplied to a trap filter is controlled in accordance with both intake air amount and exhaust gas temperature.

An exhaust gas purifying system of the present invention is for an internal combustion engine having an exhaust passageway. As schematically illustrated in FIG. 1, the system E is comprised of a trap filter 4 disposed in the exhaust passageway 3, for trapping particulates discharged from the engine. The trap filter 4 carries an oxidation catalyst for assisting burning of the particulates. A fuel supply device 5' is provided to supply fuel in a fuel supply amount into the exhaust passageway 3 upstream of the trap filter to accomplish a regeneration operation of the trap filter in which the particulates are burned. A temperature detecting device 8' is provided to detect a temperature of exhaust gas near said trap filter. An intake air amount detecting device 7' is provided to detect an amount of intake air to be supplied to the engine. A fuel supply amount controlling device 6' is provided to control the fuel supply amount during the regeneration operation of the trap filter. The controlling device 6' is arranged to increase the fuel supply amount as the intake air amount detected by the intake air amount detecting device 7' increases and to decrease the fuel supply amount as the exhaust gas temperature detected by the exhaust gas temperature detecting device 8' increases, when operated.

Accordingly, the amount of fuel to be supplied to the trap filter is controlled in accordance with the temperature of exhaust gas and the amount of air to be supplied to the engine during the regenerature operation of the trap filter. Hence, the concentration of fuel constituents in exhaust gas can be maintained precisely at a predetermined value. As a result, burning of the particulates in the trap filter can be effectively and stably carried out to accomplish the regeneration operation, while preventing a thermal damage of the trap filter and emission of unburnt fuel constituents to ambient air.

DETAILED DESCRIPTION OF THE INVENTION

Figure 1:
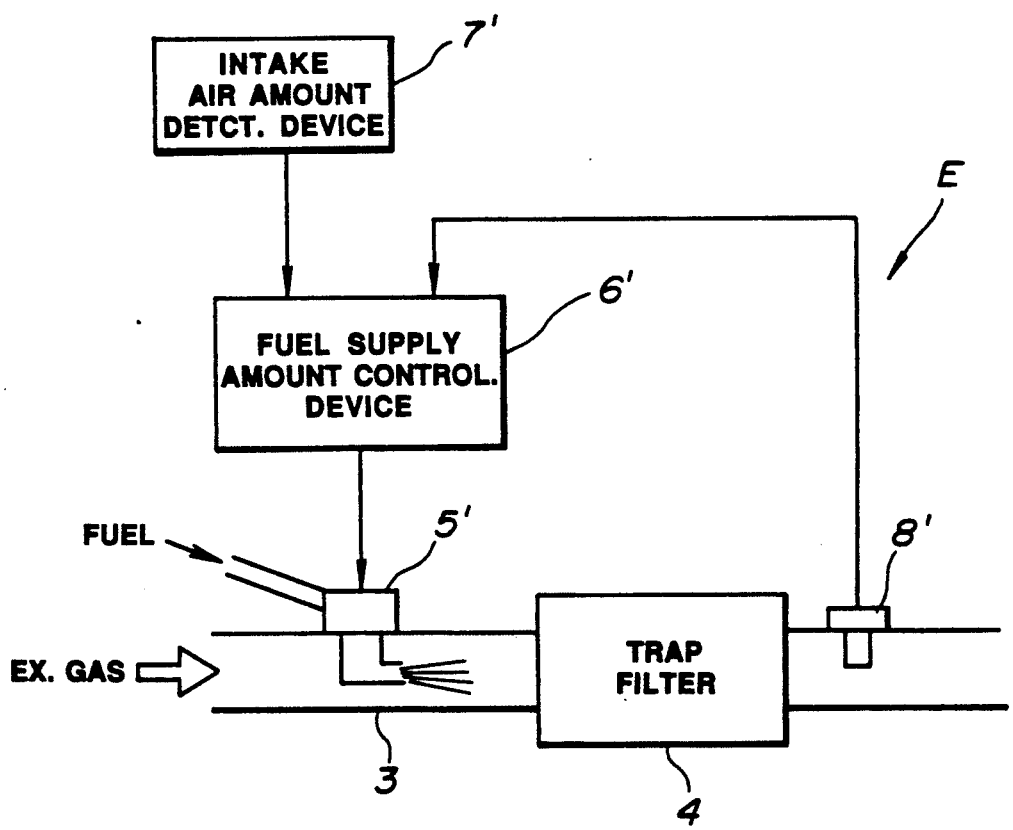
FIG. 1 is a schematic illustration showing the principle of an exhaust gas purifying system according to the present invention.
Figure 2:
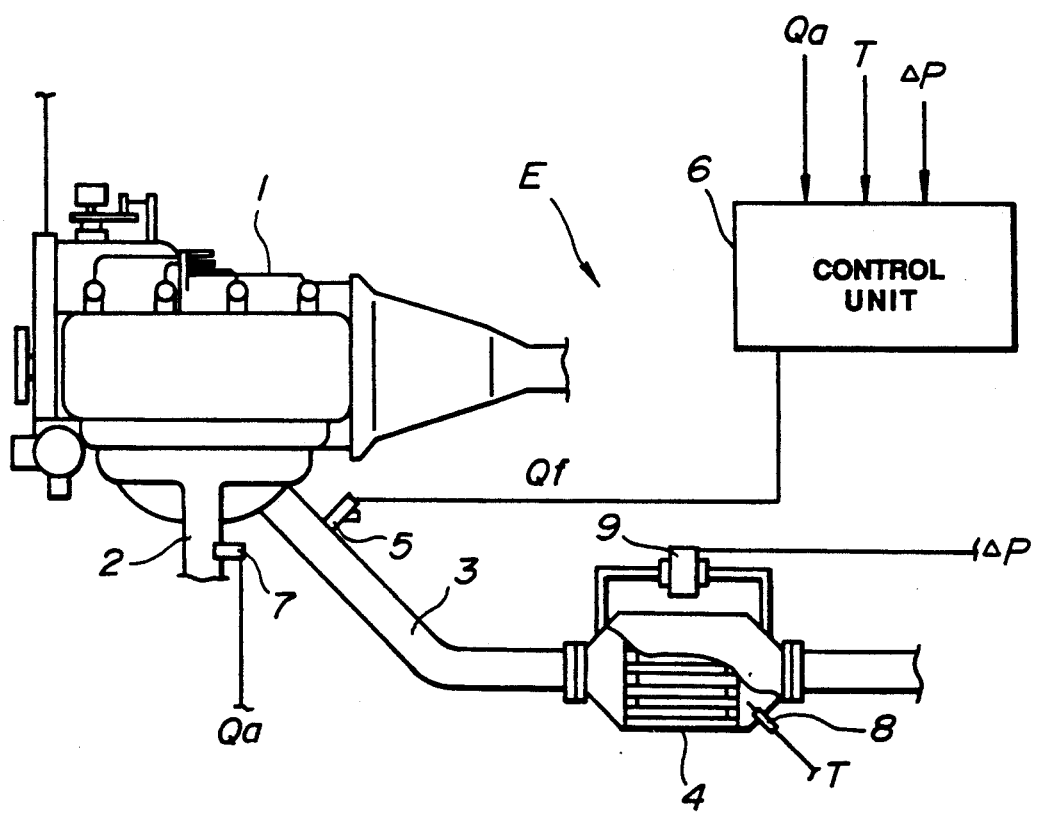
FIG. 2 is schematic view of an embodiment of an exhaust gas purifying system according to the present invention, incorporated with an internal combustion engine.

Referring to FIG. 2 of the drawing, a first embodiment of an exhaust gas purifying system according to the present invention is illustrated by the reference character E. The exhaust gas purifying system E in this embodiment is for a diesel engine 1 provided with an intake passageway 2 through which intake air is supplied to the engine and with an exhaust passageway 3 through which exhaust gas from the engine 1 is discharged to ambient air.

A trap or exhaust gas filter 4 is disposed in the exhaust passageway 3 to filter particulates and the like discharged from the engine 1 in order to prevent the particulates or the like from being emitted to ambient air. The trap filter 4 has an oxidation catalyst therein (not shown) for assisting oxidation or burning of particles within the trap filter 4. A fuel injector valve 5 is disposed to supply fuel containing burnable substances such as hydrocarbon, carbon monoxide and/or the like into the exhaust passageway 3 at a point upstream of the trap filter 4. The fuel injector valve 5 is adapted to controllably inject the fuel into the exhaust passageway 3 in response to a signal from a control unit 6, as will be discussed in detail hereafter.

An air flow meter 7 is disposed to detect an amount Qa of intake air flowing in the intake passageway 2 to be supplied to the engine 1. The air flow meter 7 is adapted to generate an electrical signal representative of the detected intake air amount Qa. A temperature sensor 8 is disposed in the exhaust passageway 3 downstream of and near the trap filter 4 in order to detect a temperature T of exhaust gas passing through the exhaust passageway 3. The temperature sensor 8 is adapted to generate an electrical signal representative of the detected exhaust gas temperature T. Additionally, a pressure sensor 9 is provided to detect a pressure differential ΔP between the upstream and downstream sides (in the exhaust passageway 3) of the trap filter 4. The pressure sensor 9 is adapted to generate an electrical signal representative of the detected pressure differential. The electrical signals from the air flow meter 7, the temperature sensor 8 and the pressure sensor 9 are input to the control circuit 6 as information for performing an appropriate regeneration operation of the trap filter 4.

The control unit 6 is constructed and arranged to judge a time at which the regeneration operation of the trap filter 4 is required, in accordance with the pressure differential between the upstream and downstream sides of the trap filter 4. It will be understood that the pressure differential increases as the amount of the particulates trapped in the trap filter 4 increases. The regeneration operation is carried out by opening the fuel injector valve 5 to supply the fuel into the exhaust passageway 3 upstream of the trap filter 4 thereby burning the trapped particulates and the like.

The amount of fuel injected from the fuel injector valve 5 is controlled in accordance with the intake air amount detected by the air flow meter 7 and the exhaust gas temperature detected by the temperature sensor 8. This control is fundamentally performed in such a manner as to increase the fuel amount injected or supplied from the fuel injector valve 5 as the intake air amount increases and to relatively decrease the fuel amount injected or supplied from the fuel injector 5 as the exhaust gas temperature increases, thereby regulating the fuel supply amount from the injector valve 5 so as to maintain a predetermined concentration of the fuel in the exhaust gas corresponding to the exhaust gas temperature.

Figure 4:
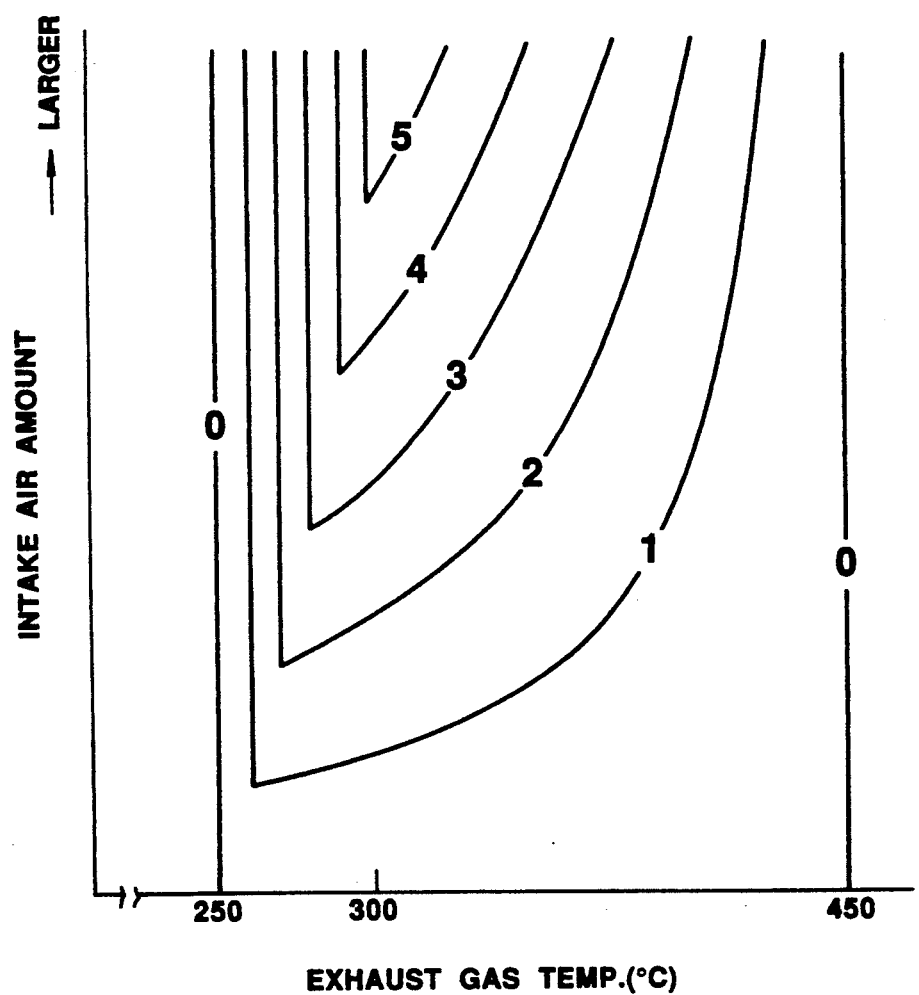
FIG. 4 is a graph showing a control map for fuel supply amount, stored in the control unit in connection with FIG. 3.

In this embodiment, the fuel injection from the fuel injector valve 5 is carried out within a range of from 250° C. to 450° C. of the exhaust gas temperature detected by the temperature sensor 8, as illustrated in the map of FIG. 4. The map indicates the amount of the fuel injected from the fuel injector valve 5 per a unit time, in which the injected fuel amount (or fuel supply amount) increases as the number in the map increases. In the case where the intake air amount is the same, the injected fuel amount decreases as the exhaust gas temperature increases. As a result, the temperature of the oxidation catalyst is maintained at a temperature (about 450° C.) at which the trapped particulates can be most efficiently burned.

However, within a temperature range of from 250° C. to 300° C., the oxidation catalyst in the trap filter 4 is not sufficiently activated, and therefore the injected fuel amount is decreased below a required amount thereby preventing a part of the injected fuel from being discharged to ambient air without being oxidized. It will be understood that a temperature rise of the catalyst is promoted under the effect of the injected fuel which serves as a source of fire in the trap filter 4.

In the case where the exhaust gas temperature is not higher than 250° C., the activation of the oxidation catalyst has not yet been made so that a sufficient oxidation under the action of the catalyst cannot be expected. Additionally, in case where the exhaust gas temperature is not lower than 450° C., the trapped particulates can be naturally burned without supply of the fuel, and a fuel supply will excessively raise the temperature of the trap filter 4. Thus, no fuel supply is supplied to the trap filter 4 within the exhaust gas temperature ranges that lie outside the range of between 250° C. and 450° C.

In this embodiment, a predetermined fuel pressure is applied to the fuel injector valve 5 under the effect of a fuel injection pump (not shown). The fuel injector valve 5 is constructed and arranged to continuously open and close at a predetermined frequency, in which the time rates of the opening of the valve 5 are regulated to increase or decrease thereby controlling the amount of fuel injected from the fuel injector valve 5. The fuel injector valve 5 may also be of the type wherein the amount of fuel injected is controlled by changing a fuel injection pressure at which the fuel is injected from the injector valve 5. The fuel being supplied to the trap filter 4 may not be directly injected into the exhaust passageway 3, employing a system in which a fuel injector valve (not shown) in the engine 1 is arranged to inject fuel at exhaust stroke of the engine so that exhaust gas containing much unburnt constituents are supplied to the exhaust passageway 3.

Next, a control operation of the exhaust gas purifying system E executed under control of the control unit 6 will be discussed with reference to the flowchart of FIG. 3.

At a step S1, the signals representative of the respective intake air amount Qa, exhaust gas temperature T and pressure differential ΔP are read in. At a step S2, a judgement is made as to whether the trap filter 4 is now in its regeneration operation. When the trap filter 4 is not in its regeneration operation, the pressure differential ΔP is compared with a predetermined value at a step S3 to judge whether the time at which the regeneration operation is required has been reached.

When the time for the regeneration operation has been obtained, a regeneration operation flag (representing that the regeneration operation is being carried out) is switched ON at a step S4. Subsequently, at a step S5, the exhaust gas temperature T is compared with a lower limit value (250° C.). When the exhaust gas temperature T is not lower than the lower limit value, the temperature T is compared with a set value (300° C.) at a step S6. In the case where the exhaust gas temperature T is lower than the lower limit value, the control is returned to "START", so that the fuel injection from the fuel injector valve 5 is stopped to prevent unburned fuel from being discharged to the ambient air. When the exhaust gas temperature T exceeds the set value (300° C.), the control goes to a step S7 in which a time for which the regeneration operation is made is counted. Then, an judgement is made as to whether the exhaust gas temperature T is lower than an upper limit value (450° C.) at a step S8. When the exhaust gas temperature T is lower than the upper limit value, a fuel supply amount Qf which is to be injected from the fuel injector valve 5 is searched for and determined in a step S9.

Searching for the fuel injection or supply amount Qf is also made within the exhaust gas temperature range of not lower than the lower limit value and lower than the set value (300° C.). The fuel injection amount Qf is determined from the map of FIG. 4 in accordance with the exhaust gas temperature T and the intake air amount Qa at that time. A signal representative of the fuel injection amount Qf is output from the control unit 6 to the fuel injector valve 5, so that the fuel injector valve 5 injects fuel in an amount corresponding to the input signal.

By virtue of the amount of fuel injected into the exhaust passageway 3, the exhaust gas particulates (carbon particles or the likes) trapped by the trap filter 4 are burned under the action of the oxidation catalyst. The fuel amount injected from the fuel injector valve 5 is controlled in accordance with the exhaust gas temperature and the intake air amount, so that a stable regeneration operation or burning can be realized in the trap filter 4. In other words, the fuel supply amount to the trap filter 4 is decreased in an exhaust gas high temperature condition in which burning of the particulates or the like are inherently good, whereas the fuel supply amount is increased as the intake air amount increases. This maintains a steady concentration of fuel constituents in the exhaust gas, and keeps a temperature range in the trap filter 4 within which the oxidation catalyst always work effectively and thereby 1) prevents the trap filter 4 from being damaged due to excessive exhaust gas temperature and 2) prevents unburned fuel constituents from being emitted into the ambient air.

Subsequently, at a step S11, a judgement is made as to whether a predetermined time has been lapsed since the start of the regeneration operation. When the predetermined time has lapsed, the control goes to a step S12 in which the time of the regeneration operation time is reset. Then, the control is goes to a step S13 in which the regeneration operation flag is switched to the OFF position to terminate the regeneration operation.

Figure 3:
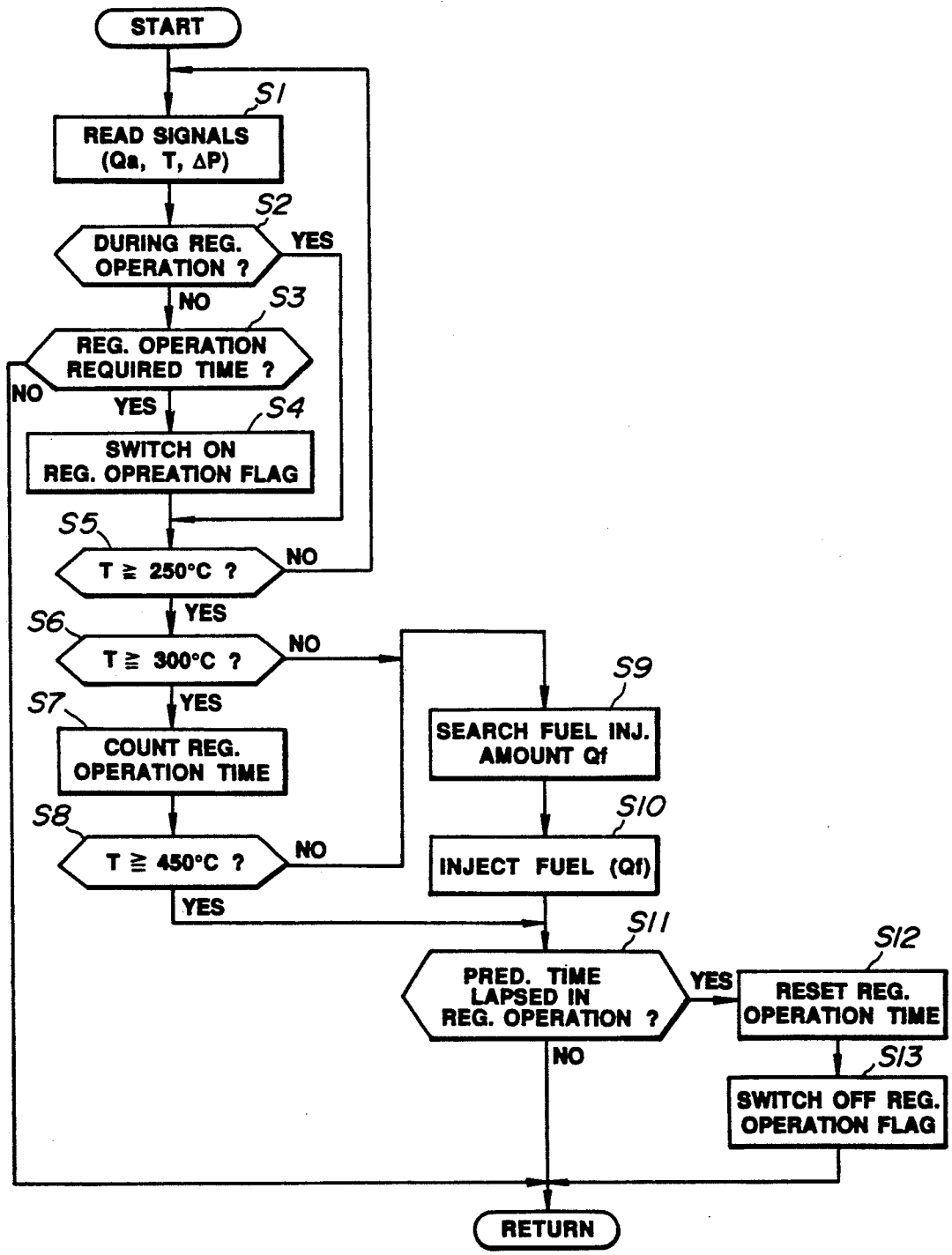
FIG. 3 is a flowchart of a control program executed by a control unit forming part of the exhaust gas purifying system of FIG. 2.

As shown in the flowchart of FIG. 3, in case where the exhaust gas temperature exceeds the upper limit value (450° C.), the regeneration operation of the trap filter 4 can be made without fuel being supplied to the trap filter 4, and therefore the control goes to the step S11 to determine whether of the regeneration operation time has lapsed.

Figure 5:
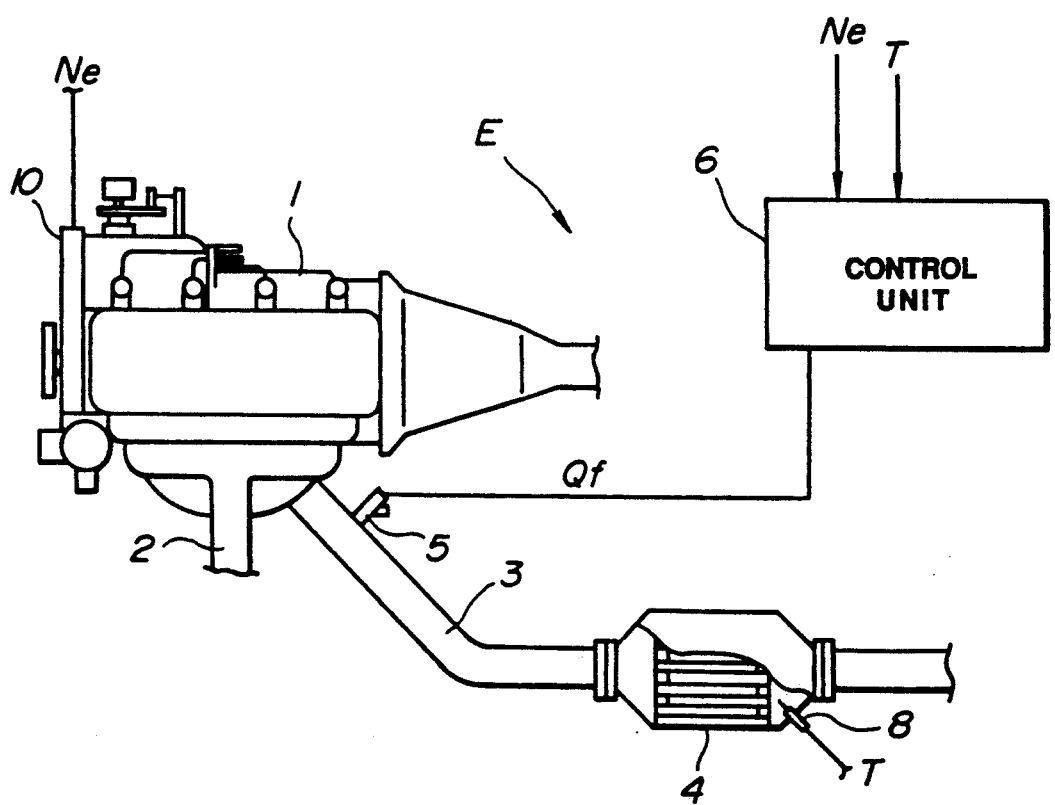
FIG. 5 is a schematic view similar to FIG. 2 but showing another embodiment of the exhaust gas purifying system according to the present invention.

FIG. 5 illustrates another embodiment of the exhaust gas purifying system according to the present invention, which is similar to the embodiment of FIG. 2 with the exception being that the air flow meter 7 and the pressure sensor 9 are omitted. In this embodiment, the engine 1 is provided with an engine speed sensor 10 for detecting an engine speed and generating an electrical signal representative of the engine speed Ne which signal is input to the control unit 6. In this case, the intake air amount is indirectly estimated in accordance with the signal from the engine speed sensor 10 by the control unit 6, in place of a process in which the intake air amount is directly measured by the air flow meter 7 as in the embodiment of FIG. 2. Accordingly, the fuel supply amount during the regeneration operation can be controlled in accordance with the intake air amount. It is to be noted that the engine speed Ne will corresponds to intake air amount in a diesel engine, so that the intake air amount can be considerably precisely estimated from the engine speed.

Additionally, in this embodiment, a judgement as to whether the required regeneration operation time has been reached is accomplished by accumulating the engine speed in place of detecting the pressure differential of the trap filter 4 as show in the FIG. 2 embodiment.

Accordingly, in this embodiment, only the engine speed Ne and the exhaust gas temperature T are used as input information to the control unit 6 to determine the fuel supply amont Qf. In accordance with this information, a judgement as to whether the required regeneration operation time has been obtained is made, and the fuel supply amount to the trap filter 4 can be appropriately controlled in accordance with the exhaust gas temperature T and the intake air amount which is estimated based on the engine speed Ne.

What is claimed is:

1. An exhaust gas purifying system for an internal combustion engine having an exhaust passageway, said system comprising:

a trap filter, disposed in the exhaust passageway, for trapping particulates discharged from the engine, said trap filter carrying an oxidation catalyst for assisting in the burning of the particulates;

means for supplying an amount of fuel into the exhaust passageway upstream of said trap filter to accomplish a regeneration operation of said trap filter in which the particulates are burned;

means for detecting a temperature value of exhaust gas downstream from said trap filter;

means for detecting an amount of intake air being supplied to the engine; and means for controlling said amount of fuel being supplied by said fuel supplying means during the regeneration operation of said trap filter, said controlling means being arranged to increase said amount of fuel being supplied by said fuel supplying means as said intake air amount detected by said intake air amount detecting means increases and to decrease said amount of fuel being supplied by said fuel supplying means as said exhaust gas temperature value detected by said exhaust gas temperature detecting means increases.

2. An exhaust gas purifying system as claimed in claim 1, further comprising means for determining when the regeneration operation is required.

3. An exhaust gas purifying system as claimed in claim 1, wherein said controlling means is operated within a first exhaust gas temperature range between first and second predetermined exhaust gas temperature levels, said first predetermined exhaust gas temperature level is lower than said second predetermined exhaust gas temperature level, and an activation of said oxidation catalyst is sufficient within said first exhaust gas temperature range.

4. An exhaust gas purifying system as claimed in claim 3, wherein said controlling means includes means for causing said fuel supplying means to stop supplying fuel to said trap filter within a second exhaust gas temperature range defined as being lower than a third predetermined exhaust gas temperature level which is lower than said first predetermined exhaust gas temperature level and within a third exhaust gas temperature range defined as being higher than said second predetermined exhaust gas temperature level; said activation of said oxidation catalyst is insufficient within said second exhaust gas temperature range; and the trapped particulates burn naturally within said third exhaust gas temperature range.

5. An exhaust gas purifying system as claimed in claim 4, wherein said controlling means includes means for decreasing said fuel supply amount within a fourth exhaust gas temperature range defined as being between said first and third predetermined exhaust gas temperature levels.

6. An exhaust gas purifying system as claimed in claim 1, wherein said intake air amount detecting means is arranged to directly detect the intake air amount.

7. An exhaust gas purifying system as claimed in claim 6, wherein said intake air amount detecting means includes an air flow meter for measuring an air flow amount in an intake passageway through which intake air is supplied to the engine.

8. An exhaust gas purifying system as claimed in claim 1, wherein said intake air amount detecting means is arranged to indirectly detect said intake air amount.

9. An exhaust gas purifying system as claimed in claim 8, wherein said intake air amount detecting means includes an engine speed sensor for detecting an engine speed of the engine.

10. An exhaust gas purifying system as claimed in claim 2, wherein said regeneration detecting means includes means for detecting a pressure differential between upstream and downstream sides of said trap filter.

11. An exhaust gas purifying system as claimed in claim 2, wherein said regeneration detecting means includes means for accumulating engine speed of the engine.

12. An exhaust gas purifying system as claimed in claim 1, wherein the engine is a diesel engine.

13. An exhaust gas purifying system as claimed in claim 1, wherein said intake air amount detecting means is adapted to detect the air flow amount in an intake passageway through which intake air is supplied to the engine.

14. An exhaust gas purifying system for a diesel engine having an exhaust passageway, said system comprising:
   a trap filter, disposed in the exhaust passageway, for trapping particulates discharged from the engine, said trap filter carrying an oxidation catalyst for assisting in the burning of the particulates;
   means for directly supplying an amount of fuel into the exhaust passageway downstream of the engine and upstream of said trap filter to accomplish a regeneration operation of said trap filter in which particulates are burned, said fuel supplying means including a fuel injector which directly supplies said amount of fuel into the exhaust passageway;
   means for detecting a temperature value of exhaust gas in said exhaust passageway downstream from said trap filter;
   means for detecting an amount of intake air being supplied to the engine; and
   means for controlling said amount of fuel being supplied by said fuel supplying means during the regeneration operation of said trap filter, said controlling means being arranged to increase said amount of fuel being supplied by said fuel supplying means as said intake air amount detected by said intake air amount detecting means increases, and to decrease said amount of fuel being supplied by said fuel supplying means as said exhaust gas temperature value detected by said exhaust gas temperature detecting means increases.

15. An exhaust gas purifying system for an internal combustion engine having an exhaust passageway, said system comprising:
   a trap filter, disposed in the exhaust passageway, for trapping particulates discharge from the engine, said trap filter carrying an oxidation catalyst for assisting in the burning of the particulates;
   means for supplying an amount of fuel into the exhaust passageway upstream of said trap filter to accomplish a regeneration operation of said trap filter in which the particulates are burned;
   means for detecting a temperature value of exhaust gas downstream from said trap filter;
   means for detecting an amount of intake air being supplied to the engine; and means for controlling said amount of fuel being supplied by said fuel supplying means during the regeneration operation of said trap filter, said controlling means being arranged to increase said amount of fuel being supplied by said fuel supplying means as said intake air amount detected by said intake air amount detecting means increases and to decrease said amount of fuel being supplied by said fuel supplying means as said exhaust gas temperature value detected by said exhaust gas temperature detecting means increases,
   wherein the detected exhaust gas temperature value is directly used by said controlling means to decrease said amount of fuel being supplied by said supplying means.

* * * * *